United States Patent [19]

Gasparotto et al.

[11] Patent Number: 6,094,620
[45] Date of Patent: Jul. 25, 2000

[54] METHOD FOR IDENTIFYING AND REMOVING MULTIPLES FROM SEISMIC REFLECTION DATA

[75] Inventors: Fernanda A. Gasparotto; Yiu-Wa August Lau, both of Houston, Tex.

[73] Assignee: ExxonMobil Upstream Research Company, Houston, Tex.

[21] Appl. No.: 09/227,745

[22] Filed: Jan. 8, 1999

[51] Int. Cl.$^7$ ............................................. G01V 1/13
[52] U.S. Cl. ................................................. 702/14; 702/2
[58] Field of Search .................................. 702/14, 16, 2; 367/24, 38, 45, 47, 50, 54; 364/421

[56] References Cited

U.S. PATENT DOCUMENTS

| | | | |
|---|---|---|---|
| 4,611,312 | 9/1986 | Ikeda ........................................... | 367/38 |
| 5,128,899 | 7/1992 | Boyd et al. ................................. | 367/50 |
| 5,365,492 | 11/1994 | Dragoset, Jr. .............................. | 367/21 |
| 5,448,531 | 9/1995 | Dragoset, Jr. .............................. | 367/45 |
| 5,521,881 | 5/1996 | Lau et al. ................................... | 367/24 |
| 5,629,905 | 5/1997 | Lau ............................................. | 367/54 |
| 5,661,697 | 8/1997 | Swan et al. ................................. | 367/47 |
| 5,729,506 | 3/1998 | Dragoset, Jr. .............................. | 367/24 |
| 5,781,503 | 7/1998 | Kim ........................................... | 367/45 |
| 5,870,691 | 2/1999 | Partyka et al. ............................. | 364/421 |

OTHER PUBLICATIONS

SEP, Waves–Table of Contents, Fourier and Z–Transform, Stanford University, California, June 14, 1999.

Verschuur, D.J.; Berkhout, A.J.; and Wapenaar, C.P.A. Adaptive Surface–related Multiple Elimination, *Geophysics*, vol. 57, No. 9 (Sep. 1992), pp. 1166–1177.

Backus, M.M. Water Reverberations—Their Nature and Elimination, *Geophysics*, vol. XXIV, No. 2 (Apr. 1959), pp. 2330261.

Dragoset, W.H. Surface Multiple Attenuation—Theory, Practical Issues, Examples, *EEAG* 55th Meeting and Technical Exhibition, Stavanger, Norway, (Jun. 7–11, 1993), Paper No. B027.

Riley, D.C. and Claerbout, J.F. 2–D Multiple Reflections, *Geophysics*, vol. 41, No. 4 (Aug. 1976), pp. 592–620.

Weglein, A.B. Multiple Attenuation: Recend Advances and the Road Ahead, Paper No. SS1.4, pp. 1492.

Zhou, B. and Greenhalgh S.A. Wave–equation Extrapolation–based Multiple Attenuation: 2–D Filtering in the f–k Domain, *Geophysics*, vol. 59, No. 9 (Sep. 1994), pp. 1377–1391.

Wiggins, J. W. Attenuation of Complex Water–Bottom Multiples by Wave–Equation–Based Prediction and Subtraction, *Geophysics*, vol. 53, No. 12 (Dec. 1988), pp. 1527–1539.

*Primary Examiner*—Christine K. Oda
*Assistant Examiner*—Victor J. Taylor
*Attorney, Agent, or Firm*—J. Paul Plummer

[57] ABSTRACT

A velocity independent method of predicting surface-related multiples in any gather of seismic data traces. In one embodiment, the method comprises the steps of regularizing said gather of seismic data traces; performing a double Fourier transformation to transform said seismic data traces from the x-t domain to the $k_x$-$\omega$ domain; decomposing said transformed seismic data traces into uncoupled amplitude and phase spectra; and obtaining an estimate of said surface-related multiples by scaling said amplitude spectrum by one-half the value of the reflection coefficient for the first reflection below the earth's surface and by doubling said phase spectrum. The estimated multiples may then be used for automated velocity determination or for multiple attenuation in the original data.

19 Claims, 4 Drawing Sheets

METHOD FOR IDENTIFYING AND REMOVING MULTIPLES FROM SEISMIC REFLECTION DATA

FIELD OF THE INVENTION

This invention relates to the field of seismic signal processing, and more specifically to prediction of multiples in seismic reflection surveying, velocity analysis of seismic reflection data, and the removal of multiples in seismic reflection surveying.

BACKGROUND OF THE INVENTION

In the oil and gas industry, seismic prospecting techniques are commonly used to aid in the search for and evaluation of subterranean hydrocarbon deposits. In seismic prospecting, a seismic source is used to generate a seismic signal which propagates into the earth and is at least partially reflected by subsurface seismic reflectors (i.e., interfaces between underground formations having different elastic properties). The reflected signals (known as "seismic reflections") are detected and recorded by seismic receivers located at or near the surface of the earth, in an overlying body of water, or at known depths in boreholes, and the resulting seismic data may be processed to yield information relating to the subsurface formations.

Seismic prospecting consists of three separate stages: data acquisition, data processing, and data interpretation. The success of a seismic prospecting operation depends on satisfactory completion of all three stages.

The seismic energy recorded by each seismic receiver during the data acquisition stage is known as a "seismic data trace." Seismic data traces often contain both the desired seismic reflections (the "primary" reflections) and unwanted multiple reflections which can obscure or overwhelm the primary seismic reflections. A primary reflection is a sound wave that passes from the source to a receiver with but a single reflection from some subsurface seismic reflector. A multiple reflection is a wave that has reflected at least three times (up, down, and back up again) before being detected by a receiver. A surface-related multiple reflection is a multiple in which at least one downward reflection occurs at the surface of the earth (onshore survey) or at the air-water interface (offshore survey). An interbed multiple has each downward reflection occurring from a subsurface reflector. Clearly, multiples contain no useful information that is not more easily extracted from primaries. Worse, the signals from multiples obscure that from the primaries, making the primaries hard to identify and interpret. For that reason, removal of multiples, or at least attenuation of multiples, by one method or another, is a necessary part of the seismic data processing stage in many environments, particularly in marine settings where multiples are especially strong relative to primaries. This is due mostly to the fact that the air-water reflection coefficient is almost unity.

Velocity analysis is the process of calculating stacking velocities from measurements of the normal moveout of seismic data. Traditional processing for velocity analysis requires that some person (the processor) decide, based on velocity stack plots and his experience in the area of the survey, what is primary and what is multiple in a seismic section. This process is subject to personal interpretation and can be very time consuming.

Current multiple attenuation techniques can be roughly divided into two categories; filtering methods and wave-equation prediction methods. Filtering methods rely on periodicity of the multiples or on significant velocity differences between primaries and multiples. Predictive deconvolution is a filtering method that assumes that multiples are periodic while primaries are not. This assumption is usually met for data from water depths less than 500 msec (approximately 1,200 feet) and approximately layered subsurface geology. In areas of water depths greater than 500 msec where the velocity difference between primaries and multiples are significant, velocity-filtering methods such τ-p and f-k filtering can be used. The variable f represents frequency, k is the wavenumber, p is the ray parameter, and τ is the zero offset intercept time.

Wave-equation methods use the physical wave-propagation phenomenon to predict and subtract multiples from data. Wave-equation methods can be very accurate, but also very expensive and time consuming to use compared to filtering methods. Wave-equation methods exploit the fact that primaries and multiples are physically related. These methods can handle complex geometries and need little or no information about the properties of the subsurface.

Filtering methods require determination, or at least an educated guess, of wave propagation velocities in the subsurface media that the reflected seismic waves pass through in their journey from the seismic source to a receiver. Seismic velocity can differ significantly from one type of medium to another.

Some wave-equation methods require structural information, i.e., information about the subsurface structure the determination of which is the reason for doing seismic exploration in the first place. Other wave-equation methods require the shape of the source wavelet which will not be a pure delta function because of reverberations and frequency bandwidth limitation. Some wave-equation methods require both structural and source wavelet information. If the shape of the source wavelet is not accounted for, i.e., is ignored, predicted multiples will not match actual multiples and attempts to cancel out multiples will fail.

From the foregoing, it can be seen that there is a need for a method for accurate prediction of multiples that is fast enough to be applied to large quantities of data such as 3-D marine surveys. Such a method should be simple, robust, efficient, and capable of computer automation. It should not need any subsurface velocity or structure information, or any source wavelet information. Preferably, the method should at the user's choice either provide velocities of the multiples or complete the process of multiple suppression. The present invention satisfies this need.

SUMMARY OF THE INVENTION

The present invention is a velocity independent method for predicting multiple seismic reflections that operates on individual gathers of seismic data, preferably common depth point or common mid-point gathers. The predicted multiples can be used for velocity analysis purposes and/or for attenuation of multiples. The information contained in the seismic data is used. No velocity or subsurface structure information is required or used. The method works best with a regular, split-spread gather containing all offsets. Differential normal moveout can be used to regularize the data, which avoids the stretching distortion of the wavelet that is produced by normal moveout. A double Fourier transform is used to transform the seismic data from the space-time (x-t) domain to the wavenumber-frequency ($k_x,\omega$) domain. The original amplitude spectrum of the data is then scaled by half the value of the waterbottom (in the case of a marine environment) reflection coefficient and the phase spectrum is doubled. This yields a first estimate of surface-related multiples which can then be used to pick velocities for the multiples or to attenuate the multiples in the data.

Multiple attenuation can be done in a completely computer-programmed process by transforming the data and the above-described first estimate of the multiples to the τ-p domain by a parabolic Radon transform. A masking filter can be generated by comparing the energy of the multiples to the energy of the data within a window, and generating a weight function for each point. Masking is based on the assumption that stacking takes care of the low amplitude multiples and only the high amplitude multiples should be removed. The filter is applied to the data to generate the final estimate of the predicted multiples, which are then transformed back to the x-t domain. The predicted multiples can be used to generate constant velocity stacks for velocity analysis and/or they can be subtracted from the original dataset to obtain demultipled gathers.

Numerous other advantages and features of the present invention will become readily apparent from the following detailed description of the invention, the embodiments described therein, from the claims, and from the accompanying drawings.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which are included within the spirit and scope of the invention, as defined by the appended claims.

DETAILED DESCRIPTION OF THE PREFERRED EMBODIMENTS

The present invention takes advantage of the physical relationship between primaries and multiples for an accurate prediction of the multiples, as in wave-equation based methods, and addresses the problem of cost and processing speed by using some aspects of the filtering techniques in its final calculations. The present invention uses solely information contained in the data to predict surface-related multiple arrivals; no velocity or structural information is used. There is no need to estimate a source wavelet for the seismic data gathers. The present invention is compact and fast.

Figure 1:
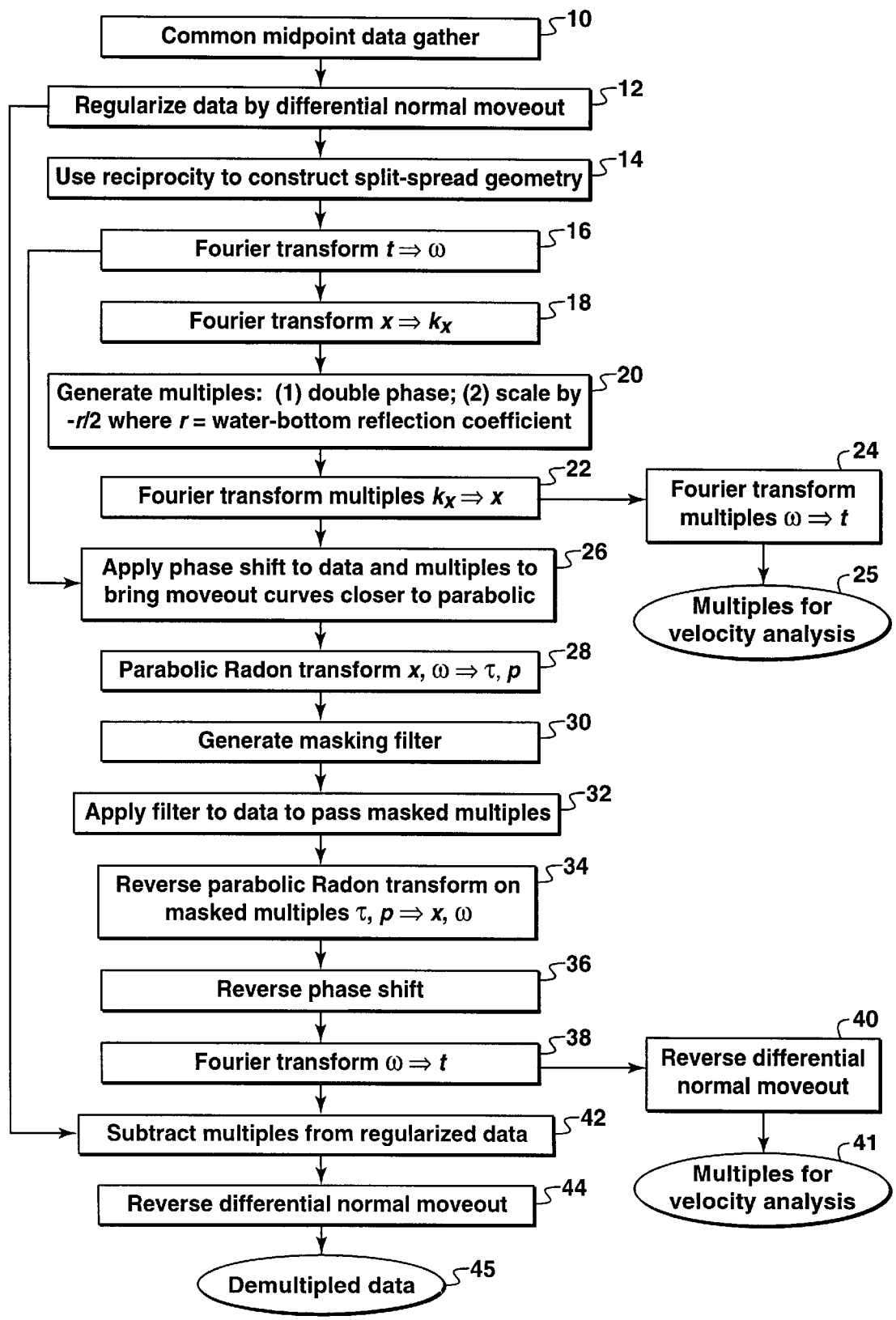
FIG. 1 is a flow chart illustrating the basic steps of one embodiment of the present invention.

The present invention may be more readily understood with reference to the flow chart of FIG. 1. Let x represent the distance (horizontal) between the seismic source (at x=0) and the various receiver locations. Preferably, the input seismic data are a regular split-spread gather, containing all offsets. This means that whereas the actual receiver locations may be at irregular intervals or spacings, and will probably extend only in one direction from the source, i.e., along the positive x-axis, instead, additional data traces (called padding traces) will be theoretically determined so that data traces exist for all uniformly-spaced values of positive x and at least the near offset values of negative x, with the spacing to be approximately the same as the actual average receiver spacing and the maximum x to be predetermined by the actual maximum receiver distance. It should be sufficient to have traces for 25% of the negative offset values of x, i.e., the quartile comprising the smallest negative values of x.

The present invention works best with common midpoint data gathers (or common depth point gathers) but will also work with other types of gathers. The regularizing of the data can be done by interpolation, but interpolation is more time consuming than another well known technique called differential normal moveout. Accordingly, at step 10, a common midpoint (or common depth point) gather is selected from the data. At step 12, differential normal moveout is preferably used to regularize the data and simulate the positive near-offset traces, including zero offset. This is done as a preprocessing step which regularizes the offsets. The differential normal moveout to be applied is calculated based on the differential offset $X_{diff}$, which represents the difference between the squared value of the offset (horizontal distance between source and receiver) in the available data $x_{orig}$ and the squared value of the offset in the desired grid $x_{reg}$:

$$x_{diff} = \sqrt{x_{orig}^2 - x_{reg}^2};$$

or in terms of travel times, $$t_{reg}^2 = t_{orig}^2 + 1/v_0^2 (x_{orig}^2 - x_{reg}^2),$$

where $v_0$ is the empirically determined velocity for the differential normal moveout correction. Unlike normal moveout with its stretching, differential normal moveout does not significantly distort the wavelet. Having the regularized data as input to the method of this invention, reciprocity between sources and receivers is used in step 14 to construct the split-spread geometry from the off-end geometry used to collect the data.

A double Fourier transform is then performed. First, the data are transformed at step 16 from the time (t) domain to the frequency (ω) domain. Then, the data are transformed from the spatial offset (x) domain to the corresponding wavenumber ($k_x$) domain at step 18. The transformed data $D(k_x,\omega)$, which is a complex number, can be decomposed into uncoupled amplitude and phase spectra:

$$D(k_x,\omega) = |D(k_x,\omega)|e^{i\phi},$$

where $i=\sqrt{-1}$ and $\phi$ is the phase angle of the complex number.

The present invention generates an estimate of the surface-related multiples, M, by scaling the original amplitude spectrum of the data by half the value of the average water-bottom reflection coefficient, r, and doubling its phase spectrum:

$$M(k_x,\omega)=-r/2|D(k_x,\omega)|e^{i2\phi}.$$

An initial guess is made for r, which is then adjusted statistically by comparison of the amplitude of predicted multiples to that of actual multiples. If a water-bottom primary in a particular gather has amplitude r, the water-bottom multiple corresponding to this primary will have approximate amplitude of $-r^2/2$; the $-r^2$ term is due to the fact that the energy reflects twice on the water bottom and once on the free surface, and the ½ is due to geometrical spreading. This approximation based on water-bottom primaries and multiples is taken as representative of all the data. By doubling the phase, the amplitude of the estimated multiple assumes the amplitude of the primary r, the multiplier $-r/2$ acts as a scale factor, taking the amplitude of the predicted multiples close to those of the multiples in the data: $-r^2/2$. Thus, a need to know the source wavelet shape is avoided. A first estimate of surface-related multiples is generated in this way at step 20, producing gathers with estimates of the multiples that will still require some adjustments later on.

After reversing the double Fourier transformation at steps 22 and 24, taking the data back to the x-t domain, the process may be halted and, through manual intervention, these gathers may be used for velocity picking for multiples. The multiples that have been generated 25 will not have the correct amplitude, but they will have good estimates of multiple trajectories which can then be converted by one skilled in the art to the correct multiple velocity. Once the multiple velocities are obtained, attenuation or filtering of the multiples can be performed by various other known methods including f-k filtering and Radon filtering. This is one embodiment of the present invention.

In a second embodiment of the invention, the described human intervention can be eliminated, and the entire process of multiple attenuation can be performed by automated means such as a suitably programmed digital computer. Persons of ordinary skill in the art of seismic data processing could easily develop computer software for performing the present invention based on the teachings set forth herein. Commercial software may be purchased to perform the known steps of the inventive process.

The multiple gathers obtained by the phase-doubling technique described above may be used, rather than directly subtracting them from the data, as a model to extract from the original data by automated means the true multiples, which are called the masked multiples. The masked multiples are generated in the τ-p domain. In order to make the moveout curves of the events in the seismic data closer to parabolic moveout, at step 26 a constant-velocity offset-dependent phase shift is applied to both the data from step 16 and the estimated multiples from step 22, both of which are in the x-ω domain. This phase shift, S, is an approximation to a constant velocity normal moveout correction. It is described by the following expression:

$$S=e^{-\omega\Delta t},$$

where $$\Delta t=t-t_0,$$

is the variation of reflection arrival time due to offset. At step 28, the data and the estimated multiples are taken to the τ-p domain by parabolic Radon transform. At step 30, a masking filter is generated. Masking in the f-k domain (i.e., the $k_x$–ω domain) is presented in Zhou and Greenhalgh as a non-linear filter and may be used in the present invention; however, masking in the τ-p domain is suggested by the authors in cases where multiple and primary overlap in f-k space is severe. See Zhou, B., and Greenhalgh, S. A., "Wave-equation extrapolation-based multiple attenuation: 2D filtering in the f-k domain", *Geophysics*, 59,1377–1391 (1994). The masking filter G basically compares the energy of the first estimate of the multiples obtained from the phase doubling operation described above and the energy of the data within a window and generates a weight function for each point:

$$G=1-\exp[-|\overline{M}_{sh}/(\epsilon\overline{D}_{sh})|^n].$$

Masking is based on the assumption that stacking takes care of the low amplitude multiples and only the high amplitude multiples should be removed. The lines over $M_{sh}$ and $D_{sh}$ indicate that each represents the sum of the RMS energy in a specified window. The parameter ε compensates for small prediction errors in amplitude and phase, and n defines a smooth taper zone. Once the masking filter is determined in this way at step 30, it is multiplied by the data at step 32 to generate the masked multiples, $M_{msk}$:

$$M_{msk}(\tau,p)=D_{sh}(\tau,p)G(\tau,p).$$

The masked multiples are then transformed at step 34 to the x-ω domain, and a reverse constant-velocity, offset-dependent phase shift is applied at step 36.

These predicted multiples 41 can be used for velocity analysis after an inverse Fourier transform from the frequency domain to the time domain at step 38, followed by a reverse differential normal moveout at step 40 to the multiples section to take it to the original condition of the data (prior to regularization): $M_{msk}(X_{orig},t)$.

For multiple attenuation, the masked multiples after step 38 are subtracted at step 42 from the regularized data (obtained at step 12) in the x-t domain generating a demultipled section $P(x_{reg},t)$:

$$P(x_{reg},t)=D(X_{reg},t)-M_{msk}(X_{reg},t).$$

A final step is to apply a reverse differential normal moveout to the demultipled section at step 44 to generate demultipled data 45 corresponding to the original data (prior to regularization): $P(x_{orig},t)$.

The second or fully automated embodiment of the present invention is most suited for areas where the subsurface structures are reasonably flat or non-complex, and where significant velocity separation exists between primaries and multiples.

Possible uses for the present invention include at least the following five: (a) simple double-phase predicted multiples can be used for picking velocities for multiples; (b) the final masked multiples can be used for picking velocities for multiples; (c) demultipled gathers can be used for picking velocities for primaries; (d) demultipled gathers can be passed to subsequent data processing modules; and (e) the present invention can be used for on-board processing while acquiring seismic data on the boat.

EXAMPLES

Figure 2:
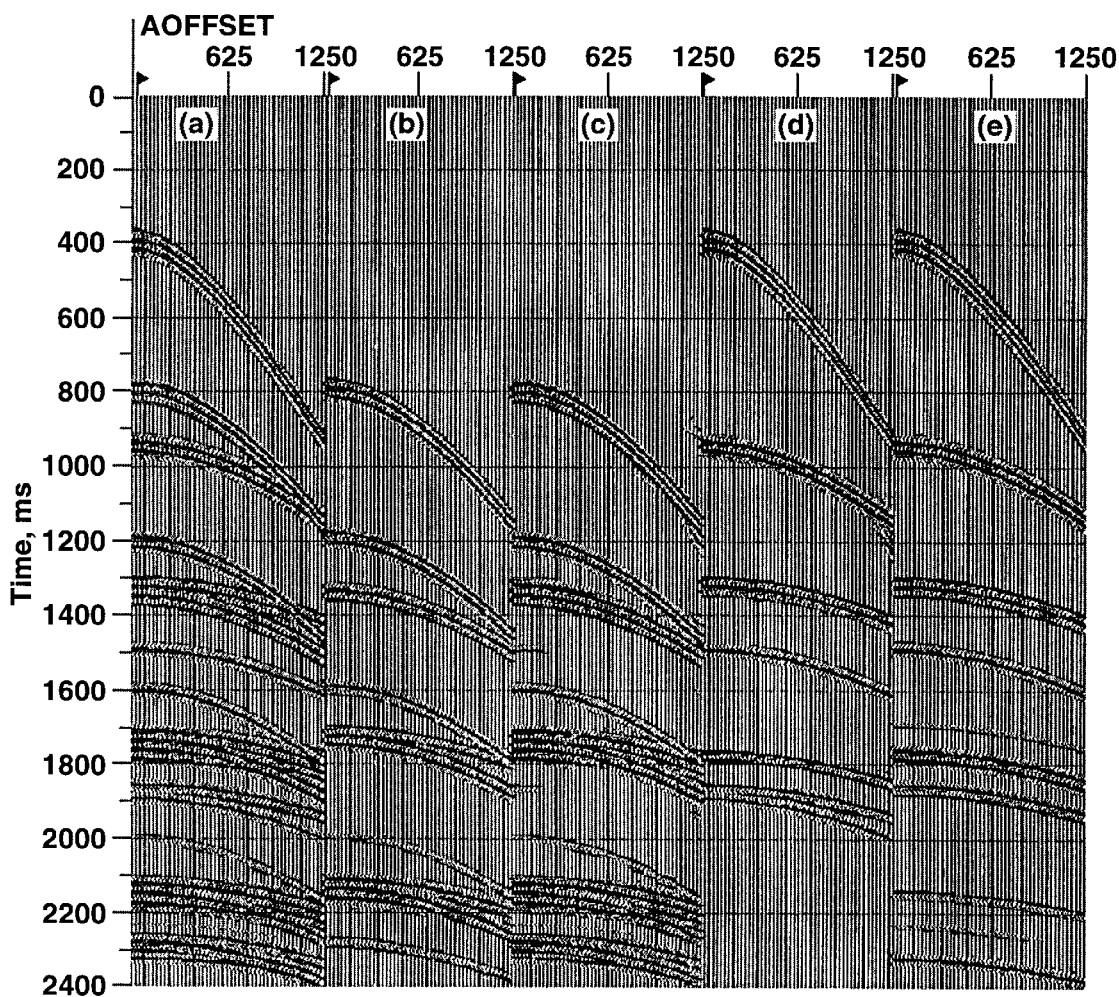
FIG. 2 illustrates application of the invention to a synthetic 1-D set of data, with panel (a) showing the data, which contains both primaries and multiples, panel (b) the first prediction of the surface-related multiples as made by the present inventive method, panel (c) the multiples from panel (b) after application of a masking filter, panel (d) the present inventive method's prediction of the primaries obtained by subtracting the masked multiples of panel (c) from the data of panel (a), panel (e) the data generated without surface multiples for comparison with panel (d), and further detail illustrated in FIGS. 3 and 4.

The present invention was applied to a synthetic one-dimensional (1-D) gather containing primaries, surface-related and interbed multiples. FIG. 2 shows in panels (a) the data with multiples, (b) the first prediction of the multiples (double-phase), (c) the masked multiples, (d) the demultipled gather, and (e) the data generated without surface-related multiples. In panel (b) the surface-related multiples are predicted but there are clear differences in terms of amplitude and phase relative to the multiple content in the data. After applying the masking filter the masked multiples in panel (c) are generated, and these are subtracted from the original data in panel (a) resulting in the demultipled section in panel (d). Comparing the latter with the section generated without the surface-related multiples in panel (e) (with proper source and receiver ghosts applied for better comparison), the present invention performed the multiple suppression very well. The present invention is not expected to attenuate interbed multiples. In this example, though, some interbed multiples between 2.0 and 2.2 seconds were attenuated by the filtering (masking) step due to their low amplitude and the fact that their velocities overlapped with surface-related multiples. The four primaries at approximately 0.4, 0.95, 1.32, and 1.78 seconds are well preserved. The present invention worked very well, in this ideal case, even in areas where there was clear interference between primary and multiple events as in the region between 1.3 and 1.4 seconds, and also where there was interference and the moveout curves were very close as in the region between 1.7 and 1.8 seconds.

Figure 3:
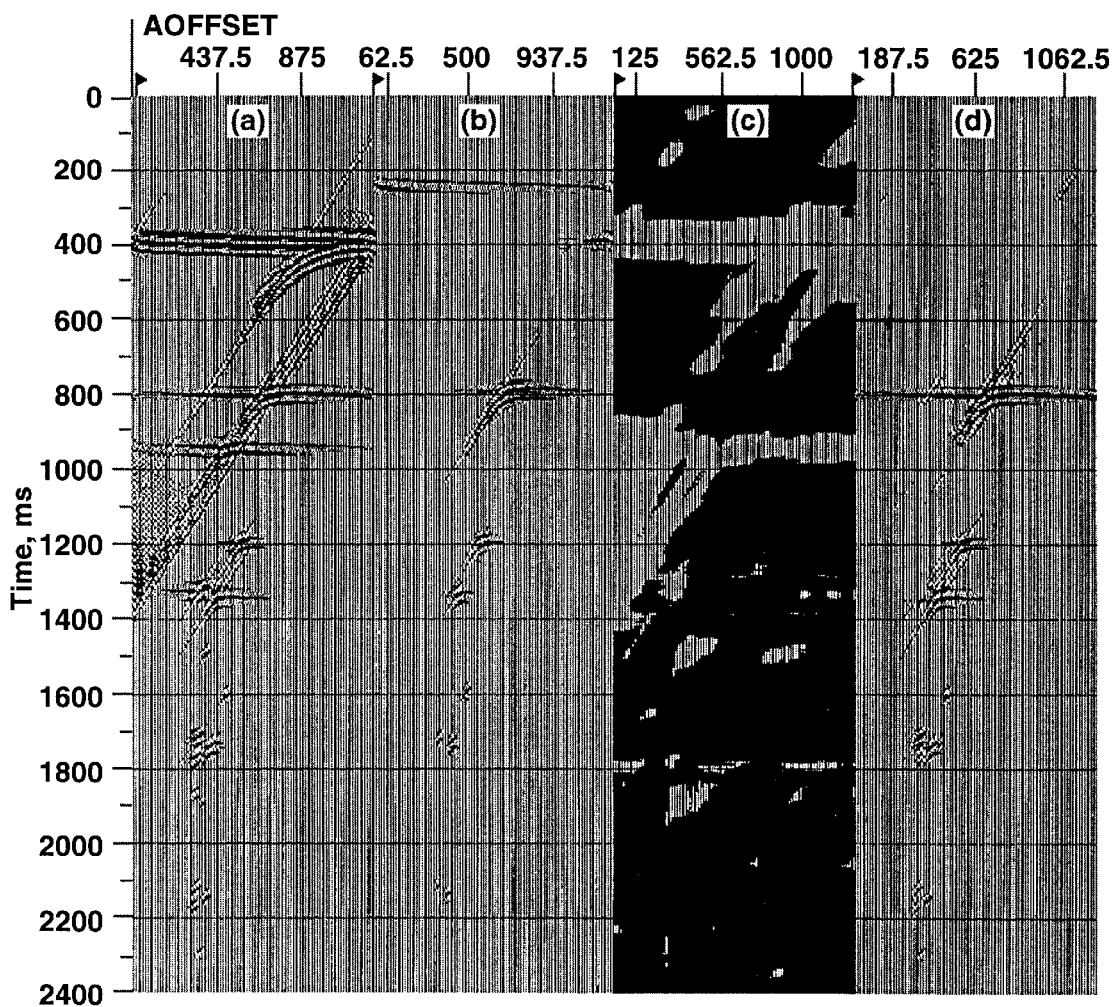
FIG. 3 shows the intermediate steps in the τ-p domain which are omitted in FIG. 2, with panel (a) showing the data in the τ-p domain, panel (b) the first prediction of multiples, panel (c) the masking filter, and panel (d) the masked multiples.

FIG. 3 shows the intermediate steps in the τ-p domain. Panel (a) shows the data, and panel (b) shows the first prediction of the multiples. The masking filter, G, generated by comparing the RMS energy of panels (a) and (b) appears in panel (c). Applying the filter to the data generates the masked multiples in panel (d).

Figure 4:
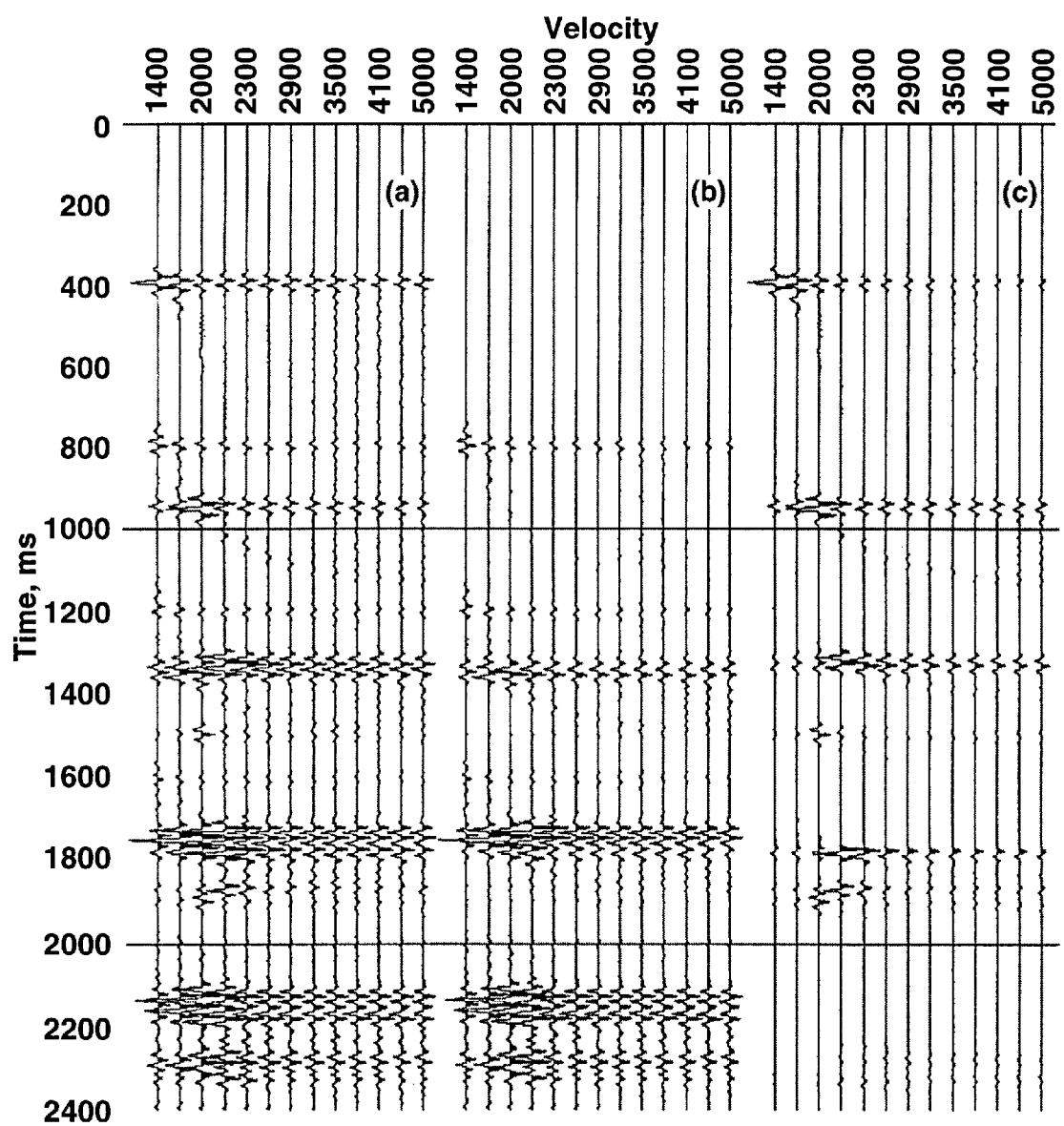
FIG. 4 shows how the primary reflections can be clearly identified in constant velocity panels, with panel (a) showing the data, panel (b) the masked multiples, and panel (c) the demultipled data with the primaries readily identifiable.

Another application of the present invention is in velocity analysis. The modeled multiples are used to appropriately attenuate the multiples in the gather. The panels in FIG. 4 show constant velocity stacks for (a) original gather, (b) multiples gather, and (c) demultipled gather. In panel (c) after multiple removal, the primaries can be clearly pointed out at 0.4, 0.95, 1.32, and 1.78 seconds. Referring back to the prestack gathers in FIG. 2, these primary events are easily identified.

Tests on a synthetic data set for a 1-D model showed very good results. The method attenuated all surface-related multiples, even in areas where there was a clear overlap and very little moveout difference between primaries and multiples in the time section.

The use of the predicted multiples for velocity analysis was very successful. In areas where multiple and primary velocities are difficult to separate, the present invention can be especially useful.

The foregoing description is directed to particular embodiments of the present invention for the purpose of illustrating the invention. It will be apparent, however, to one skilled in the art that many modifications and variations to the embodiments described herein are possible. For example, even though the foregoing detailed description of preferred embodiments is worded in terms of a marine environment, the present invention nevertheless can be useful for on-land seismic reflections where the first significant reflector below the surface of the earth is the first subterranean water table, or the base of the weathered layer. All such modifications and variations are intended to be within the scope of the present invention, as defined in the appended claims.

We claim:

1. A method for predicting surface-related multiples in a gather of seismic data traces, said method comprising the steps of:

(a) regularizing said gather of seismic data traces;

(b) performing a double Fourier transformation to transform said seismic data traces from the x-t domain to the $k_x$-ω domain;

(c) decomposing said transformed seismic data traces into uncoupled amplitude and phase spectra; and (d) obtaining an estimate of said surface-related multiples by scaling said amplitude spectrum by one-half the value of the reflection coefficient for the first reflection below the earth's surface and by doubling said phase spectrum.

2. The method claim 1, wherein said regularizing is accomplished by differential normal moveout.

3. The method of claim 1, wherein said regularizing is accomplished by interpolation.

4. The method of claim 1, wherein said method further comprises the steps of:

(a) selecting a plurality of seismic data traces having near offsets from said gather of seismic data traces;

(b) using reciprocity to generate a set of padding traces having negative offsets from said plurality of seismic data traces having near offsets; and (c) adding said set of padding traces to said gather of seismic data traces prior to said double Fourier transformation.

5. The method of claim 1, wherein said gather of seismic data traces is a common depth point gather of seismic data traces.

6. The method of claim 1, wherein said gather of seismic data traces is a common midpoint gather of seismic data traces.

7. The method of claim 1, wherein said seismic data traces are marine seismic data traces and said first reflector below the surface of the earth is the water bottom.

8. The method of claim 1, wherein said seismic data traces are on-land seismic data traces and said first reflector below the surface of the earth is the top of the first subterranean water table.

9. The method of claim 1, wherein said seismic data traces are on-land seismic data traces and said first reflector below the surface of the earth is the base of the weathered layer.

10. A method for removing surface-related multiples from a gather of seismic data traces, said method comprising the steps of:

(a) regularizing said gather of seismic data traces;

(b) performing a double Fourier transformation to transform said seismic data traces from the x-t domain to the $k_x$-ω) domain;

(c) decomposing said transformed seismic data traces into uncoupled amplitude and phase spectra;

(d) obtaining an initial estimate of said surface-related multiples by scaling said amplitude spectrum by one-half the value of the reflection coefficient for the first reflection below the earth's surface and by doubling said initial phase spectrum;

(e) using Radon transforms to transform both said seismic data traces and said initial estimate of said surface-related multiples to the τ-p domain;

(f) generating a masking filter by comparing the energy of said initial estimate of said multiples and the energy of said seismic data traces in the τ-p domain;

(g) applying said masking filter to said seismic data traces in the τ-p domain to generate a set of masked multiples;

(h) transforming said set of masked multiples back to the x-t domain; and (i) subtracting said masked multiples from said seismic data traces in the x-t domain.

11. The method of claim 10, wherein said regularizing is accomplished by differential normal moveout.

12. The method of claim 10, wherein said regularizing is accomplished by interpolation.

13. The method of claim 10, wherein said method further comprises the steps of:

(a) selecting a plurality of seismic data traces having near offsets from said gather of seismic data traces;

(b) using reciprocity to generate a set of padding traces having negative offsets from said plurality of seismic data traces having near offsets; and (c) adding said set of padding traces to said gather of seismic data traces prior to said double Fourier transformation.

14. The method of claim 10, wherein said gather of seismic data traces is a common depth point gather of seismic data traces.

15. The method of claim 10, wherein said gather of seismic data traces is a common midpoint gather of seismic data traces.

16. The method of claim 10, wherein said method further comprises the steps of:

(a) applying a constant-velocity, offset-dependent phase shift to said seismic data traces and said initial estimate of said surface-related multiples in the $k_x$-$\omega$ domain to make the moveout curves for the events in said seismic data traces closer to parabolic; and (b) applying a reverse constant-velocity, offset-dependent phase shift to said multiples after said masked multiples have been transformed back to the x-t domain.

17. The method of claim 10, wherein said Radon transforms are parabolic Radon transforms.

18. The method of claim 10, wherein said seismic data traces are marine seismic data traces, and said first reflector below the surface of the earth is the water bottom.

19. A method for removing surface-related multiples from a gather of seismic data traces, said method comprising the steps of:

(a) regularizing said gather of seismic data traces;

(b) performing a double Fourier transformation to transform said seismic data traces from the x-t domain to the $k_x$-$\omega$ domain;

(c) decomposing said transformed seismic data traces into uncoupled amplitude and phase spectra;

(d) obtaining an initial estimate of said surface-related multiples by scaling said amplitude spectrum by one-half the value of the reflection coefficient for the first reflection below the earth's surface and by doubling said initial phase spectrum;

(e) generating a masking filter by comparing the energy of said initial estimate of said multiples and the energy of said seismic data traces in the $k_x$-$\omega$ domain;

(f) applying said masking filter to said seismic data traces in the $k_x$-$\omega$ domain to generate a set of masked multiples;

(g) transforming said set of masked multiples back to the x-t domain; and (h) subtracting said masked multiples from said seismic data traces in the x-t domain.

\* \* \* \* \*